United States Patent
Sabzevari et al.

(10) Patent No.: US 12,124,268 B2
(45) Date of Patent: Oct. 22, 2024

(54) SYSTEM AND METHOD FOR DETECTING VIRTUAL POINTS AND ASCERTAINING VIRTUAL PLANES FOR AUTONOMOUS NAVIGATION OF A MOVABLE ROBOTIC UNIT, AND ROBOTIC SYSTEM INCLUDING THE ROBOTIC UNIT

(71) Applicant: Robert Bosch GmbH, Stuttgart (DE)

(72) Inventors: Reza Sabzevari, Hildesheim (DE); Charlotte Arndt, Hildesheim (DE); Javier Civera, Saragossa (ES)

(73) Assignee: ROBERT BOSCH GMBH, Stuttgart (DE)

( * ) Notice: Subject to any disclaimer, the term of this patent is extended or adjusted under 35 U.S.C. 154(b) by 374 days.

(21) Appl. No.: 17/450,029

(22) Filed: Oct. 5, 2021

(65) Prior Publication Data

US 2022/0129004 A1     Apr. 28, 2022

(30) Foreign Application Priority Data

Oct. 22, 2020   (DE) .......................... 102020213337.9

(51) Int. Cl.
G05D 1/00     (2024.01)
G06T 7/579    (2017.01)

(52) U.S. Cl.
CPC ......... G05D 1/0246 (2013.01); G05D 1/0274 (2013.01); G06T 7/579 (2017.01)

(58) Field of Classification Search
CPC .............................. G05D 1/0246; G06T 7/579
USPC .......................................................... 701/28
See application file for complete search history.

(56) References Cited

U.S. PATENT DOCUMENTS

| | | | | |
|---|---|---|---|---|
| 5,966,141 A * | 10/1999 | Ito | ............................ | G06T 13/80 345/473 |
| 6,754,370 B1 * | 6/2004 | Hall-Holt | ............... | G01B 11/25 356/3 |
| 6,816,607 B2 * | 11/2004 | O'Donnell | .............. | G06T 17/00 382/154 |
| 11,019,503 B2 * | 5/2021 | Pang | ..................... | H04W 16/18 |
| 11,094,117 B2 * | 8/2021 | Bell | .......................... | G06T 3/40 |

(Continued)

FOREIGN PATENT DOCUMENTS

| | | |
|---|---|---|
| DE | 102013207899 A1 | 10/2014 |
| DE | 102018113672 A1 | 12/2018 |

(Continued)

*Primary Examiner* — Richard A Goldman
(74) *Attorney, Agent, or Firm* — NORTON ROSE FULBRIGHT US LLP; Gerard A. Messina (57) ABSTRACT

A method for autonomous navigation of a movable robotic unit, in particular at least as part of a SLAM method. A plurality of virtual points from the surroundings around the detection unit is detected using a detection unit. An optimization problem of graph theory is solved using a control and/or regulation unit for ascertaining a position and/or a movement of the robotic unit and/or for detecting the surroundings as a function of the detected virtual points. At least one virtual plane is ascertained, using the control and/or regulation unit, as a function of at least one group of virtual points of the plurality of virtual points. For ascertaining a position and/or a movement of the robotic unit and/or for representing the surroundings, the ascertained virtual plane is used for solving the optimization problem of graph theory using the control and/or regulation unit.

11 Claims, 5 Drawing Sheets

(56) References Cited

U.S. PATENT DOCUMENTS

| | | | |
|---|---|---|---|
| 11,348,269 B1 * | 5/2022 | Ebrahimi Afrouzi | A47L 11/4025 |
| 11,797,020 B1 * | 10/2023 | Jiang | G05D 1/0246 |
| 2006/0290695 A1 * | 12/2006 | Salomie | G06T 17/20 345/423 |
| 2008/0004517 A1 * | 1/2008 | Bhandarkar | G06T 7/33 600/407 |
| 2008/0065359 A1 * | 3/2008 | Rudolph | G06F 30/20 703/2 |
| 2012/0330636 A1 * | 12/2012 | Albou | G16B 15/30 703/12 |
| 2015/0235447 A1 * | 8/2015 | Abovitz | G02B 27/4205 345/633 |
| 2016/0026253 A1 * | 1/2016 | Bradski | H04N 13/128 345/8 |
| 2019/0156507 A1 * | 5/2019 | Zeng | G06F 18/00 |
| 2020/0254613 A1 | 8/2020 | Condolo | |
| 2020/0306989 A1 | 10/2020 | Vogel et al. | |
| 2021/0000006 A1 * | 1/2021 | Ellaboudy | A01B 69/008 |
| 2021/0089040 A1 * | 3/2021 | Ebrahimi Afrouzi | A47L 9/2873 |
| 2021/0209941 A1 * | 7/2021 | Maheshwari | G08G 1/0112 |
| 2021/0295548 A1 * | 9/2021 | Veiga | G06T 7/73 |
| 2022/0066456 A1 * | 3/2022 | Ebrahimi Afrouzi | A47L 9/2873 |
| 2022/0129004 A1 * | 4/2022 | Sabzevari | G05D 1/0246 |
| 2022/0187841 A1 * | 6/2022 | Ebrahimi Afrouzi | G05D 1/0274 |
| 2022/0252906 A1 * | 8/2022 | Schwarz | G06F 30/10 |
| 2022/0300738 A1 * | 9/2022 | Hu | G06V 20/64 |
| 2023/0026489 A1 * | 1/2023 | Poltaretskyi | A61B 17/1703 |
| 2023/0128959 A1 * | 4/2023 | Ito | G05D 1/0297 701/26 |
| 2023/0314169 A1 * | 10/2023 | Hokai | G01C 21/3848 701/409 |

FOREIGN PATENT DOCUMENTS

| | | |
|---|---|---|
| DE | 112017002154 T5 | 1/2019 |
| WO | 2019160447 A1 | 8/2019 |

* cited by examiner

SYSTEM AND METHOD FOR DETECTING VIRTUAL POINTS AND ASCERTAINING VIRTUAL PLANES FOR AUTONOMOUS NAVIGATION OF A MOVABLE ROBOTIC UNIT, AND ROBOTIC SYSTEM INCLUDING THE ROBOTIC UNIT

CROSS REFERENCE

The present application claims the benefit under 35 U.S.C. § 119 of German Patent Application No. DE 102020213337.9 filed on Oct. 22, 2020, which is expressly incorporated herein by reference in its entirety.

BACKGROUND INFORMATION

A method for autonomous navigation of a movable robotic unit has already been provided, in at least one method step a plurality of virtual points from the surroundings of the detection unit being detected with the aid of a detection unit, and in at least one further method step an optimization problem of graph theory being solved with the aid of a control and/or regulation unit for ascertaining a position and/or a movement of the robotic unit and/or for detecting the surroundings as a function of the detected virtual points.

SUMMARY

The present invention is directed to a method for autonomous navigation of a movable robotic unit, in particular at least as part of a SLAM method. In accordance with an example embodiment of the present invention, in at least one method step, a plurality of virtual points from the surroundings of the detection unit being detected with the aid of a detection unit, and in at least one further method step an optimization problem of graph theory being solved with the aid of a control and/or regulation unit for ascertaining a position and/or a movement of the robotic unit and/or for detecting the surroundings as a function of the detected virtual points.

It is provided that in at least one method step, at least one virtual plane is ascertained, with the aid of the control and/or regulation unit, as a function of at least one group of virtual points of the plurality of virtual points, in at least one method step for ascertaining a, in particular the above-mentioned, position and/or a, in particular the above-mentioned, movement of the robotic unit and/or for representing the surroundings, the ascertained virtual plane being used for solving the optimization problem of graph theory with the aid of the control and/or regulation unit.

For representing the surroundings, the at least one virtual plane together with the plurality of detected virtual points is preferably used, and the ascertained virtual plane is used for solving the optimization problem of graph theory with the aid of the control and/or regulation unit. The statement that "the ascertained virtual plane is used for solving the optimization problem of graph theory" is understood in particular to mean that at least one parameter that describes the virtual plane, for example a vector within the virtual plane, a point on the virtual plane, a normal vector of the virtual plane, or the like is used as a parameter and/or as a variable for solving the optimization problem of graph theory. A position, in particular a probability distribution of a position, of the detection unit and/or of the robotic unit at a point in time in space is preferably ascertained by solving the optimization problem of graph theory with the aid of the control and/or regulation unit.

The method is preferably provided for ascertaining a position of the detection unit and/or of the robotic unit within the surroundings over time, it being possible in particular to determine a movement of the detection unit and/or of the robotic unit in space and/or an arrangement of objects in the surroundings, preferably for the autonomous navigation of the robotic unit within the surroundings. The term "provided" is understood in particular to mean specially designed. The statement that "an object or a method is provided for a certain function" is understood in particular to mean that the object or the method fulfills and/or carries out this certain function in at least one application state and/or operating state and/or a method step. The surroundings preferably form a work area of the robotic unit. The method is preferably designed as part of a SLAM method of a robotic system, in particular of the robotic unit. A "SLAM method" is preferably understood by those skilled in the art to mean a method for simultaneous position determination and mapping in the robotic system, in particular within the method, a virtual map of the surroundings and a spatial location of a movable unit, in particular the robotic unit, being ascertained within the virtual map, preferably at the same time. The virtual points are preferably detected with the aid of the detection unit via features that are imaged on a detected image plane, the individual features being ascertained by a color value evaluation, a grayscale evaluation, or the like, of the image plane. The virtual points are preferably ascertained with the aid of the detection unit, in particular via the SLAM method, in each case as a function of positions of an image of one feature in each case that are ascertained from at least two detected images. In particular, exactly one virtual point is associated with each feature. In addition, it is possible for further virtual points that are preferably situated within one plane to be predefined with the aid of a user and/or with the aid of an external unit. For example, the further virtual points include a surface of a door, of a wall, of a floor, of a ceiling, of an image, or the like in the surroundings. It is preferably possible that the further points are used for ascertaining a virtual plane with the aid of the control and/or regulation unit.

In particular, the at least one virtual plane is designed as a geometric plane, in particular according to the mathematical definition. In particular, the at least one virtual plane is designed as a two-dimensional object having an unlimited extent. A "control and/or regulation unit" is understood in particular to mean a unit that includes at least one control electronics system. A "control electronics system" is understood in particular to mean a unit that includes a processor unit that is designed, for example, as a processor, as a microcontroller, as an FPGA, or the like, and that includes a memory unit designed as a virtual or physical memory, for example, and that includes at least one operating program and/or algorithm that are/is stored in the memory unit. A "robotic unit" is understood in particular to mean a unit that automatically, at least temporarily, performs an activity or mechanical work, in particular controlled partially or at least temporarily via the control and/or regulation unit. A "detection unit" is preferably understood to mean a unit which in at least one operating state detects at least one object and/or at least one life form in the surroundings of the unit, in particular at least one, in particular visually recognizable, feature of the detected object and/or of the detected life form being converted into at least one virtual point. Each detected virtual point preferably includes information that describes and/or indicates at least one position of the virtual point in three-dimensional space. For example, a position of a virtual point in an image plane of the detection unit and a distance of the virtual point from the detection unit, in particular the image plane, are ascertained with the aid of the detection unit. It is possible, for example in a design of the detection unit as a monocular camera, for a distance of a virtual point from the detection unit, in particular an image plane of the detection unit, to be ascertained with the aid of the detection unit and/or with the aid of the control and/or regulation unit via at least two features or positions of the virtual point, temporally and/or spatially offset relative to one another, in an image plane of the detection unit. The at least one virtual plane is preferably ascertained with the aid of the control and/or regulation unit via at least one recognition algorithm that is preferably provided for determining the group of virtual points from the plurality of detected virtual points. The recognition algorithm is preferably provided for grouping virtual points of the plurality of detected virtual points and comparing their arrangement to at least one description of a virtual plane, the particular virtual plane or group of virtual points having the smallest average error of all virtual points of the particular group of virtual points relative to the representation of the associated virtual plane being preferably selected from a plurality of comparisons of different groups of virtual points to various virtual planes. The recognition algorithm is preferably designed as a random sample consensus (RANSAC) algorithm. The virtual planes are preferably determined in each case, with the aid of the control and/or regulation unit, from a particular selected group of virtual points, using a singular value decomposition (SVD) method. It is preferably possible for individual virtual points to be added to the particular selected group of virtual points or removed from the particular selected group of virtual points during an execution of the recognition algorithm, in particular the RANSAC algorithm, for ascertaining the at least one virtual plane, preferably as a function of a particular position relative to a certain virtual plane and/or of an error parameter of the position of the particular virtual point, it preferably being possible to speed up an ascertainment of the at least one virtual plane.

In accordance with an example embodiment of the present invention, in at least one method step, for solving the optimization problem of graph theory with the aid of the control and/or regulation unit, preferably at least one cost function, in particular a Huber k estimation function, is optimized, in particular minimized, which in particular forms a sum of all errors of all parameters to be taken into account, in particular the virtual points and the virtual plane. At least one position of the detection unit is preferably ascertained in at least one method step with the aid of the control and/or regulation unit, as a function of an ascertained position of the virtual points and of the at least one virtual plane.

The method, in particular at least one detection of the virtual points, the ascertainment of the at least one virtual plane, and/or the solution of the optimization problem of graph theory for ascertaining a position and/or a movement of the robotic unit and/or for representing the surroundings, is preferably carried out with the aid of the detection unit and the control and/or regulation unit, automatically and/or without influence by a user of the robotic system, in particular the robotic unit. The method is preferably designed as a computer-implemented method. The method is preferably provided for processing data that are detected via the detection unit, in particular the virtual points, virtual planes, and/or parameters in each case being designed as electronic data. The control and/or regulation unit is preferably configured to carry out at least the method step (s) for determining the group of virtual points, for ascertaining the at least one virtual plane, for solving the optimization problem, and/or for ascertaining a position and/or a movement of the robotic unit and/or for representing the surroundings, in particular at least essentially autonomously. The virtual plane is preferably expressed in homogeneous coordinates by $$\pi = (\pi_1, \pi_2, \pi_3, \pi_4)^T, \in \mathbb{P}^3,$$

via normal vector n and a distance d from an origin point of the plane, where $$n = \frac{(\pi_1, \pi_2, \pi_3)^T}{\sqrt{\pi_1^2 + \pi_2^2 + \pi_3^2}}, \text{ and}$$

$$d = \frac{-\pi_4}{\sqrt{\pi_1^2 + \pi_2^2 + \pi_3^2}}$$

or via a minimal representation as a function of only three degrees of freedom with exponential or logarithmic mapping with the aid of quaternions q, via $$q^{(s+1)} = \exp(\omega) q^{(s)}, \text{ where}$$

$$\exp(\omega) = \begin{pmatrix} \frac{1}{2}\text{sinc}\left(\frac{1}{2}\|\omega\|\right)\omega \\ \cos\left(\frac{1}{2}\|\omega\|\right) \end{pmatrix}, \omega \in \mathbb{R}^3$$

In particular, ω corresponds to an incremental change in the virtual plane. In particular, $\hat{\omega} = w/\|w\|$ corresponds to an axis on which a normal vector of the virtual plane is situated, where $\|\omega\|$ describes a distance of the normal vector from an origin point of the plane. The at least one virtual plane is preferably ascertained solely via virtual points of the surroundings that are detected with the aid of the detection unit. Alternatively, it is possible for other parameters that are independent from the detected virtual points, such as other pieces of information about the surroundings, to be used for an optimization of the virtual plane. The solution of the optimization problem, in particular for ascertaining a position and/or a movement of the robotic unit and/or for representing the surroundings, particularly preferably takes place with the aid of factor graphs. The virtual planes, in particular for solving the optimization problem and/or for ascertaining a position and/or a movement of the robotic unit and/or for representing the surroundings, are preferably not detected directly with the aid of the detection unit, but, rather, are constructed from detected virtual points that are preferably detected via the SLAM method.

It is possible for at least one class to be associated with detected virtual points of the plurality of detected virtual points, with the aid of the control and/or regulation unit, as a function of an arrangement relative to the detection unit, the robotic unit, and/or other virtual points of the plurality of detected virtual points. It is preferably possible for all virtual points of a class, with the aid of the control and/or regulation unit, to be combined into a group of virtual points for ascertaining a virtual plane. In addition, it is possible that individual virtual points that have no class or have a different class and/or, in particular taking into account an error parameter, that are situated within a virtual plane that is ascertained via the group of virtual points which in each case have the class, are added to the group of virtual points which in each case have the class and/or with which the class is associated in each case. For example, preferably in an application in a building, the class "floor" is associated with detected virtual points that are situated at a lower area of a totality of the detected virtual points, in particular a virtual plane being ascertained via all virtual points having this class.

Due to the example embodiment of the method according to the present invention, an advantageously accurate determination of the position and/or the movement of the robotic unit in space and/or an advantageously accurate detection of the surroundings may be made possible. Based on pieces of information that are additionally ascertained from an arrangement within the surroundings, which in particular are detected via virtual points, further reference points for navigating the robotic unit may be determined via virtual planes. An error in determining a trajectory of the robotic unit in space may advantageously be reduced, in particular compared to a determination solely from detected virtual points. An advantageously improved interpretation of detected virtual points within the surroundings may be made possible. Advantageously accurate autonomous navigation of the robotic unit may be made possible. An advantageously simple and advantageously effective representation of arrangements of virtual points may be made possible via a representation using planes, it being advantageous in particular that little additional computing power is required. In addition, detected points in the surroundings situated on planes are generally advantageously relevant with regard to a simplified representation of objects, spaces, and/or boundaries of a three-dimensional space in which the robotic unit moves. In particular, geometric structures and particular arrangements of points in the surroundings may be taken into account in ascertaining a position and/or a movement of the robotic unit and/or for representing the surroundings, in particular for SLAM methods and/or for detection units that generally cannot directly consider/detect same.

In addition, it is provided that when the virtual plane is used for solving the optimization problem of graph theory, the virtual points of the group of virtual points that predefine the virtual plane are in each case projected onto the ascertained virtual plane, projected points, in particular individual points, situated on the at least one virtual plane being used as boundary conditions for a solution of the optimization problem of graph theory. An advantageously accurate solution of the optimization problem of graph theory for ascertaining a position and/or a movement of the robotic unit and/or for representing the surroundings may be made possible, in particular since a large number of boundary conditions may advantageously be predefined via the additional points that are ascertained by a projection onto the virtual plane. Advantageously accurate autonomous navigation of the robotic unit may be made possible. The projected points are preferably generated via a projection of the virtual points of the group of virtual points onto the at least one virtual plane. The group of virtual points, via which the at least one virtual plane has been ascertained and/or from which the projected points have been generated, is preferably removed and/or not taken into account for an, in particular subsequent, ascertainment of the position and/or the movement of the robotic unit and/or for detecting the surroundings from the plurality of virtual points. In particular due to use of homogeneous coordinates for the virtual plane, a conversion of a representation of the virtual points of the group of virtual points and/or of the projected points is necessary.

A state of the overall system, in particular for the autonomous navigation of the robotic unit, is preferably given by:

$$x_M = (c_1^T, c_i^T, \ldots, P_1^T, P_j^T, \ldots, \pi_1^T, \pi_k^T \ldots y_1^{1^T}, \ldots, y_l^{k^T}, \ldots)^T,$$

where $C = \{c_i | i=1, \ldots, m; c_i \in SE(3)\}$ preferably specifies an arrangement of image points that are associated in particular with the detection unit and/or a detected image plane, where $P = \{P_j | j=1, \ldots, n; P_j \in \mathbb{R}^3\}$ preferably indicates detected virtual points in three-dimensional space, where $K = \{\pi_k | k=1, \ldots, p; \pi_k \in \mathbb{P}^3\}$ preferably indicates the at least one virtual plane, and where $Y = \{y_l^k | k=1, \ldots, p; l=1, \ldots, n_k; y_l^k \in \mathbb{R}^2\}$ preferably indicates the projected points.

A projected point relative to an origin point of the virtual plane is preferably represented via two mutually orthogonal vectors. The origin point of the virtual plane may be represented via $$O_k^w = (-dn_x, -dn_y, -dn_z)^T$$

A normal vector n of the virtual plane is perpendicular to the two mutually orthogonal vectors $v_0$ and $v_1$, which in particular describe a projected point relative to an origin point of the virtual plane, and preferably has the value 1. Vector $v_0$ may thus be described as:

$$v_0 = \left( \frac{-n_z}{n_x \sqrt{1 + \left(\frac{n_z}{n_x}\right)^2}} \; 0 \; \frac{1}{\sqrt{1 + \left(\frac{n_z}{x}\right)^T}} \right)^T,$$

where $v_1$, in particular due to its orthogonal arrangement relative to $v_0$ and n, may be determined via $v_1 = v_0 \times n$.

A virtual point $P_j \in \mathbb{R}^3$, in particular of the group of virtual points, in three-dimensional space may preferably be represented as a projected point $y_l^k$ via $$y_l^k = \begin{bmatrix} (P_j - O_k^w) \cdot v_0 \\ (P_j - O_k^w) \cdot v_1 \end{bmatrix}$$

A virtual point $P_j$ that is projected onto the at least one virtual plane, in particular in the virtual points used for ascertaining the position and/or the movement of the robotic unit and/or for detecting the surroundings, preferably for ascertaining the position and/or the movement of the robotic unit and/or for detecting the surroundings, is preferably replaced by a projected point $y_l^k$ with the aid of the control and/or regulation unit.

Detected virtual points ($z_{i,j}$), in particular with the exception of virtual points that are projected onto the virtual plane, and projected points ($z_{i_k,j_k,k}$) together form set $Z = \{z_{1,1}, \ldots, z_{i,j}, \ldots, z_{i_k,j_k,k}, \ldots\}$, which preferably forms the boundary conditions for solving the optimization problem of graph theory. A robust Huber loss function $\rho_h$, in each case including a covariance matrix $\Omega_{i,j}$ that indicates a position of the detection unit or of the image plane of the detection unit at a point in time of the particular detected points, is preferably used for solving the optimization problem. A cost function C to be optimized is preferably as follows:

$$C = \sum_{i,j} \rho_h(e_{i,j}^T \Omega_{i,j}^{-1} e_{i,j}) + \sum_{i,k,l} \rho_h(e_{i,k,l}^T \Omega_{i,k,l}^{-1} e_{i,k,l}).$$

Cost function C is preferably optimized via a least squares method or via a least mean squares (LMS) algorithm with the aid of the control and/or regulation unit. Cost function C to be optimized preferably represents a sum of all included points, in particular the virtual points and the projected points.

An error function et for a virtual point $z_{i,j}$ in a position of the detection unit and/or in an image plane of the detection unit is preferably given via a projection equation $$e_{i,j} = z_{i,j} - \text{proj}(c_i, P_j)$$

A projected point $y_l^k$ in a virtual plane $\pi_k$ may in particular be transferred into a general world coordinate system via the equation $$Y_{k,l}^w = [v_0 v_1] \cdot y_l^k + O_k^w$$

A transferred virtual point $Y_{k,l}^w$ is preferably transferred into an image plane of the detection unit via $$e_{i,k,l} = z_{i,k,l} - \text{proj}(c_i, Y_{k,l}^w(\pi_k, y_l^k))$$

An advantageously large number of boundary conditions for solving the optimization problem may be achieved by taking into account the projected points of the at least one virtual plane. An advantageously accurate determination of the position of the detection unit and/or of the detected virtual points in the world coordinate system may thus be made possible. The ascertainment of the position and/or the movement of the robotic unit and/or of the detection of the surroundings preferably takes place as a function of virtual points that are transferred into an image plane of the detection unit, and of projected points that are transferred into the image plane of the detection unit, with the aid of the control and/or regulation unit, via a SLAM method, in particular an ORB-SLAM or ORB-SLAM2 method. In particular, positions of points, in particular the transferred virtual points and the transferred projected points, of two detected images that are offset, in particular temporally and/or spatially, relative to one another are used for determining the position of the detection unit during a detection of the images and/or a movement of the detection unit between two positions of the detection unit, associated with each of the images. In particular in one embodiment in which the detection unit is spaced apart from the robotic unit, a position and/or a movement of the detection unit are/is ascertained via a solution of the optimization problem with the aid of the SLAM method, a position and/or movement of the robotic unit in space or within the surroundings preferably being ascertained in a further method step with the aid of the control and/or regulation unit as a function of a position, in particular ascertained via detected virtual points and/or via the at least one virtual plane, and/or movement of the robotic unit relative to the detection unit and of the ascertained position and/or movement of the detection unit.

For ascertaining the movement of the robotic unit when solving the optimization problem, the cost function is preferably optimized only for image points $c_i$ that are in particular associated with the detection unit and/or a detected image plane, in particular the detected virtual points and the projected points being set, in particular not optimized. In particular, all virtual points, image points, and/or projected points are optimized for detecting and/or representing the surroundings. Detected virtual points and/or projected points ascertained from virtual points are preferably checked with the aid of the control and/or regulation unit, prior to being taken into account, for ascertaining a position and/or a movement of the robotic unit and/or for representing the surroundings via at least one further image that is detected via the detection unit. The individual detected virtual points and/or the individual projected points ascertained from virtual points are preferably used, with the aid of the control and/or regulation unit, to ascertain a position and/or a movement of the robotic unit and/or for a representation of the surroundings, in particular for solving the optimization problem, if these have been detected in each case by at least two images detected via the detection unit.

Furthermore, it is provided that in at least one method step, virtual points from the surroundings of the detection unit are continuously or periodically detected with the aid of the detection unit, a dominant virtual plane being periodically or continuously determined with the aid of the control and/or regulation unit as a function of a totality of detected virtual points and used for solving the optimization problem of graph theory. An advantageously accurate solution of the optimization problem of graph theory may be made possible for ascertaining a position and/or a movement of the robotic unit and/or for representing the surroundings, and at the same time with an advantageously low requirement for computing power of the control and/or regulation unit, in particular since in each case only the dominant plane having an advantageously low error is taken into account. An advantageously continuously improving ascertainment of the position and/or the movement of the robotic unit and/or representation of the surroundings may be made possible, in particular since a totality of the virtual points may be continuously expanded and reinterpreted. A "dominant virtual plane" is understood in particular to mean a virtual plane which, in particular at a point in time, is described by a maximum number of virtual points of the totality of virtual points that are in particular detected up to the point in time, and/or which is formed by a set of virtual points having an average error parameter that is preferably lower than average error parameters of other ascertained virtual planes. In particular, the maximum number of virtual points is greater than the number of virtual points which in each case describe another virtual plane that is different from the dominant virtual plane. If further virtual points are detected in a further method step with the aid of the detection unit, a further virtual plane that is ascertained via the control and/or regulation unit including a greater number of virtual points and/or being ascertained via a group of virtual points that includes more virtual points than the in particular previously ascertained virtual plane, the further virtual plane is determined as the dominant plane and used in a future ascertainment of the position and/or the movement of the robotic unit and/or in a future detection of the surroundings for solving the optimization problem of graph theory. Multiple virtual planes are preferably ascertained from the totality of detected virtual points, in particular automatically, periodically, or continuously, with the aid of the control and/or regulation unit, the dominant virtual plane preferably being determined from the multiple virtual planes. The multiple ascertained planes are preferably compared to one another for determining the dominant virtual plane, taking into account the number of virtual points used for ascertaining the individual planes, an average error parameter of the virtual points used for ascertaining the individual planes, a distribution of the virtual points in space used for ascertaining the individual planes, or the like. The dominant virtual plane is preferably determined from the multiple ascertained virtual planes via an algorithm, with the aid of the control and/or regulation unit, in particular various weighting factors being associated in each case with the number of virtual points used for ascertaining the individual planes, an average error parameter of the virtual points used for ascertaining the individual virtual planes, and a distribution of the virtual points in space used for ascertaining the individual planes, the dominant virtual plane being ascertained, for example, via a comparison of a sum of a determination parameter that at least includes the weighting factors. The virtual planes are preferably ascertained from the detected virtual points via a RANSAC algorithm. For example, the distribution of the virtual points in space used for ascertaining the individual planes is ascertained in each case for determining the dominant virtual plane over a maximum surface area within the virtual plane which just completely encompasses all virtual points used for ascertaining the individual planes. The average error parameter of virtual points used for ascertaining a virtual plane preferably represents an average value of error parameters of all virtual points used for ascertaining the virtual plane. The error parameter of a virtual point of a group of virtual points preferably indicates a deviation of a detected and/or ascertained position of the virtual point in three-dimensional space from the virtual plane that is ascertained at least in part via the virtual point, and/or from the virtual plane ascertained via the group of virtual points. It is possible for a virtual plane to be determined as a dominant virtual plane only if at least 10%, preferably at least 12.5%, and more preferably at least 15%, of all detected virtual points are encompassed by the virtual plane, preferably designed as part of the group of virtual points used for ascertaining the virtual plane.

In addition, it is provided that in at least one method step, a group of virtual points forming a virtual plane is ascertained with the aid of the control and/or regulation unit as a function of at least one stored limiting value parameter that in particular describes a maximum deviation of the individual virtual points of the group of virtual points from a virtual plane to be ascertained. An advantageously accurate ascertainment of the virtual plane may be made possible. The limiting value parameter preferably indicates a maximum deviation of a virtual point of a virtual plane to be ascertained, in which the virtual point is used just for ascertaining the virtual plane. In at least one method step, the limiting value parameter is preferably stored in the control and/or regulation unit, in particular the memory unit of the control and/or regulation unit, in particular during initial start-up or manufacture of the robotic unit. It is possible for virtual points, in particular a group of virtual points, for ascertaining a virtual plane and/or for ascertaining a group of virtual points for ascertaining a virtual plane, to be plotted as a function of a minimum distance from the virtual plane, and to be filtered with the aid of a hypothesis test, in particular with the aid of a $\chi^2$ test, for example 0.95 being provided as the critical value of a significance level. Alternatively or additionally, it is possible for the limiting value parameter to be adapted dynamically, with the aid of the control and/or regulation unit, as a function of the number of detected virtual points and/or of the number of virtual points of the group of virtual points. For example, for a very large number of virtual points of a group of virtual points, for ascertaining a virtual plane a smaller value is used for the limiting value parameter than for a smaller number of virtual points of a group of virtual points. A virtual plane may thus always be ascertained, regardless of the detected surroundings or the number of virtual points that describe the surroundings, it being possible for an error of an ascertained virtual plane to be advantageously reduced, in particular for surroundings that are detected more accurately via more virtual points, as the result of which, for example, a position of the detection unit in space may advantageously be precisely determined.

In addition, it is provided that in at least one method step, a plurality of virtual planes is ascertained with the aid of the control and/or regulation unit, a plurality of ascertained virtual planes being used as boundary conditions for solving the optimization problem of graph theory with boundary conditions. An advantageously accurate solution of the optimization problem for navigating the robotic unit may be achieved. Arrangements of groups of virtual points may advantageously be easily interpreted by use of a plurality of ascertained virtual planes. In addition, erroneously or faultily ascertained virtual points from a data set may thus be identified. A plurality of projected points that are ascertained via the plurality of virtual planes are preferably used for solving the optimization problem or to ascertain the position and/or the movement of the robotic unit, and/or to represent the surroundings. The plurality of ascertained virtual planes is preferably determined and/or selected from the plurality of ascertained virtual planes as a function of the number of virtual points used for ascertaining the individual virtual planes, an average error parameter of the virtual points used for ascertaining the individual virtual planes, and/or a distribution of the virtual points in space used for ascertaining the individual virtual planes. In particular, the plurality of the ascertained virtual planes from the plurality of ascertained virtual planes is determined via a similar method as for determining the dominant virtual plane. It is possible for the plurality of detected virtual planes to include exactly two, more than two, at least three, or even more virtual planes. It is possible for the number of virtual planes, which is to be determined for the plurality of virtual planes for solving the optimization problem with the aid of the control and/or regulation unit, to be predefined as a function of the surroundings. For example, for an interior space in which the robotic unit moves, more virtual planes are determined from the plurality of ascertained virtual planes than for a garden area or the like. Alternatively or additionally, it is possible for the number of virtual planes for the plurality of virtual planes, which is to be determined for solving the optimization problem, to be predefined as a function of an average error parameter of the virtual points forming the individual virtual planes, for example as a function of a limiting value of the average error parameter. For example, with the aid of the control and/or regulation unit, for solving the optimization problem a number of the plurality of virtual planes from the plurality of detected virtual planes is determined as a function of the number of the plurality of detected virtual planes, which may be ascertained with sufficient accuracy via detected virtual points.

Furthermore, it is provided that the detection unit is designed as a monocular detection unit, the plurality of virtual points being detected via at least two images that are detected temporally offset relative to one another with the aid of the detection unit, in particular via a monocular SLAM method. An advantageously accurate monocular SLAM method for navigating the robotic unit may be achieved. Detected virtual points may advantageously be easily interpreted, it being possible, for example using a monocular method, to advantageously identify erroneously or faultily estimated positions of individual virtual points via an arrangement relative to the ascertained virtual plane and/or via a noticeably increased error parameter relative to other virtual points situated in an arrangement with the individual virtual points. A "monocular detection unit" is understood in particular to mean a detection unit which at a point in time detects only exactly one image in each case. In particular, the monocular detection unit includes exactly one individual eye, for example a camera, which in particular is provided in each case for simultaneously detecting the surroundings in exactly one image plane. The monocular SLAM method is particularly preferably designed as an ORB-SLAM or ORB-SLAM2 method. A plurality of virtual points is preferably detected via exactly one image plane for each position of the detection unit, in particular for each specific point in time. For ascertaining the position and/or the movement of the robotic unit and/or for representing the surroundings, in each case detected virtual points from at least two different detected image planes of the detection unit are preferably used which in particular have been detected at different times and/or in different positions and/or orientations of the detection unit.

Moreover, it is provided that in at least one method step, in particular as part of the SLAM method, a virtual map of the surroundings is created as a function of the at least one virtual plane with the aid of the control and/or regulation unit, in particular a boundary within the virtual map being represented by the virtual plane. An advantageously simple abstraction of the surroundings of the robotic unit may be made possible. An advantageously rapid and simple creation of a virtual map may be made possible, in particular relative to a reconstruction of the surroundings as a virtual map solely via detected virtual points. For creation of the virtual map as a function of the detected virtual points, in particular of an arrangement of the detected virtual points, it is possible for the at least one virtual plane to be converted into at least one flat surface, via which in particular a boundary within the virtual map is represented. In particular, the virtual plane for creation of the virtual map and/or for conversion into at least one flat surface in a two-dimensional space that is spanned and/or occupied by the virtual plane is spatially delimited. In one embodiment in which more than one virtual plane is ascertained and used for creating the virtual map, it is possible for the virtual planes for creating the virtual map to each be delimited by two of the virtual planes along at least one line of intersection. For creating a two-dimensional virtual map, it is preferably possible for the at least one virtual plane to be converted into at least one straight line or a straight section, in particular as a function of an orientation of the virtual plane in space. It is preferably possible for a virtual map of the surroundings, predefined by a user and/or by an external unit, to be stored in the control and/or regulation unit. The at least one virtual plane and/or the generated virtual map are/is preferably compared to the predefined virtual map with the aid of the control and/or regulation unit, for example an arrangement of the virtual plane that has features, in particular walls, doors, edges, railings, or other typically at least essentially flat-surface boundaries, being compared to the predefined virtual map. It is possible for a/the feature of the predefined virtual map or some other feature of the predefined virtual map that is predefined via the feature, for example in a location in space, to be used, with the aid of the control and/or regulation unit, for a future ascertainment of a position and/or a movement of the robotic unit and/or for a representation of the surroundings and/or for generating the virtual map, in particular when a feature of the predefined virtual map matches the ascertained virtual plane.

In addition, it is provided that when the virtual map is created and/or the virtual map is stored, in particular in the robotic unit, the at least one virtual plane replaces at least the group of virtual points that forms the virtual plane. Advantageously small memory space requirements for storing the virtual map may be achieved. An advantageously low requirement for computing power for representing, handling, and/or processing the virtual map, for example by the robotic unit, may be made possible. An advantageously simple and cost-effective embodiment of the robotic unit may be achieved, in particular if the virtual map is to be processed on and/or via the robotic unit for controlling and/or navigating the robotic unit. When the virtual map is stored, for example in the memory unit and/or in the robotic unit, with the aid of the control and/or regulation unit, preferably only the virtual plane is stored, in particular for replacing the group of virtual points, forming the virtual plane, by the virtual plane, in particular the group of virtual points that form the virtual plane being discarded and/or not stored. In particular, a virtual plane, in particular in a minimal representation via an origin point and two vectors, has smaller memory space requirements and/or a lower requirement for computing power of a processing unit that processes the virtual map, in particular the control and/or regulation unit and/or a dedicated processing unit of the robotic unit, than the group of virtual points that forms the virtual plane.

Furthermore, it is provided that in at least one method step, in particular after an ascertainment of the at least one virtual plane, the group of virtual points is adapted with the aid of the control and/or regulation unit in such a way that at least one virtual point, in particular a plurality of virtual points of the group of virtual points, is removed from the group of virtual points as a function of an arrangement and/or of an error parameter of the virtual point, in particular the plurality of virtual points, relative to the virtual plane and/or relative to other virtual points of the group of virtual points that form the virtual plane. Complex and/or similarly oriented structures within the surroundings may advantageously be associated with exactly one real plane and/or with objects in the surroundings that are different from a real plane. Increased error in a representation of a virtual plane due to virtual points inadvertently associated with the virtual plane may thus be advantageously prevented. An error parameter for a virtual point for a detection of the virtual point is preferably ascertained with the aid of the detection unit and/or, the control and/or regulation unit, in particular via the SLAM method. For example, a virtual point is removed from a group of virtual points, which is provided in particular for ascertaining a virtual plane, if a ratio of the error parameter of the virtual point to an average error parameter of the group of virtual points exceeds a predefined limiting value and/or if the error parameter of the virtual point exceeds a predefined limiting value of the error parameter. It is possible for a virtual point for ascertaining a virtual plane at a point in time to be associated with a group of virtual points, in a further method step further virtual points being detected that are associated at least in part with the group of virtual points, in particular an average error parameter of the group of virtual points that forms the virtual plane decreasing. In particular, when a limiting value of the comparison value is exceeded, it is possible for the virtual point to be removed from the group of virtual points at a later point in time, for example via a comparison to the decreased average error parameter of the group of virtual points that form the virtual plane. For example, it is possible for virtual points to be detected via an edge that extends at least essentially in parallel but transversely with respect to a wall, and for these virtual points together with other virtual points detected via the wall to be associated with a group of virtual points for ascertaining a virtual plane. This may possibly result in increased error of a representation of the virtual plane, which could propagate via the solution of the optimization problem and thus lead to increased inaccuracy of the SLAM method. In this exemplary embodiment, it is possible for the virtual points that are detected via the edge to be identified with the aid of the control and/or regulation unit via an arrangement of the virtual points along a straight line relative to an arrangement of the other virtual points from the group of virtual points on a plane that encompasses the wall, and to be subsequently deleted from the group of virtual points. By determining such virtual points that are inadvertently and/or erroneously associated with the virtual plane, these virtual points may be excluded from an ascertainment of the virtual plane. An advantageously accurate representation of the virtual plane for solving the optimization method, in particular for ascertaining the projected points, may thus be made possible. Other embodiments of the method step are also possible for removing virtual points as a function of an arrangement of same relative to the virtual plane and/or relative to other virtual points of the group of virtual points that form the virtual plane, for example via an increased error parameter of virtual points within a cluster, situated next to one another or in the near vicinity of one another, or the like. A point that is removed from a group of virtual points for ascertaining a virtual plane is preferably re-added, with the aid of the control and/or regulation unit, to the plurality of virtual points provided for ascertaining a position and/or a movement of the robotic unit and/or for representing the surroundings.

Moreover, it is provided that in at least one further method step, in particular after removal of at least one virtual point or a plurality of virtual points from a group of virtual points, the ascertained virtual plane is adapted as a function of the adapted group of virtual points with the aid of the control and/or regulation unit, in particular previous ascertainments of the position and/or the movement of the robotic unit and/or for detecting the surroundings being adapted, taking the adapted virtual plane into account. An advantageously accurate representation of ascertained virtual planes may be made possible. A subsequent correction of erroneously or faultily ascertained virtual planes may advantageously be made possible. An advantageously exact ascertainment of the movement of the robotic unit in space may be achieved. Advantageously accurate navigation of the robotic unit may be achieved. Via the ascertained plane and virtual points that are removed, in particular subsequently, from the group of virtual points, ascertained projected points are removed with the aid of the control and/or regulation unit and/or not taken into account for solving the optimization problem. Virtual points of the adapted group of virtual points for solving the optimization problem are preferably projected onto the adapted virtual plane, a plurality of projected points preferably being determined. It is possible for previous ascertainments of a position and/or a movement of the robotic unit to be subsequently corrected as a function of the adapted virtual plane, for example a new ascertainment taking place, taking the adapted virtual plane into account. The adapted virtual plane is preferably compared to the previously ascertained virtual plane, only a correction of previous ascertainments of the position and/or the movement of the robotic unit taking place if the adapted virtual plane and the previously ascertained virtual plane differ significantly, preferably if a deviation angle between the adapted virtual plane and the previously ascertained virtual plane is greater than 1.5°, preferably greater than 1° and more preferably greater than 0.5°. Alternatively, it is possible for a limiting value for the deviation angle to be dynamically determined with the aid of the control and/or regulation unit as a function of an average error parameter of the adapted group of virtual points and/or of the group of virtual points forming the previously ascertained virtual plane is.

In addition, in accordance with an example embodiment of the present invention, a robotic system, in particular an at least semi-autonomous robotic system, for carrying out a method according to the present invention, including at least one movable robotic unit, including at least one detection unit, and including at least one control and/or regulation unit, is provided.

For example, the detection unit is designed as a camera, in particular as a monocular camera, as a stereo camera, as a RGB-D camera (depth camera) or the like, or as a LIDAR or radar system or the like. The robotic unit is preferably designed as a navigable, floatable, and/or flyable robot. In particular, the robotic unit has an at least semi-autonomous or fully autonomous design. In particular, the robotic unit includes at least one drive unit and at least one means of locomotion, for example a wheel or a rotor, which in particular is designed to be drivable via the drive unit. The control and/or regulation unit is preferably configured to control and/or regulate the robotic unit, in particular the drive unit and/or a steering unit of the robotic unit, preferably for navigating the robotic unit. "Configured" is understood in particular to mean specially programmed, specially designed, and/or specially equipped. The statement that "an object is configured for a certain function" is understood in particular to mean that the object fulfills and/or carries out this certain function in at least one application state and/or operating state. The robotic unit preferably includes, at least in part, the detection unit and/or the control and/or regulation unit. Alternatively, it is possible for the robotic unit to be designed/situated separately from the detection unit and/or the control and/or regulation unit, in particular control commands being transmitted to the robotic unit, in particular the drive unit and/or the steering unit, via a communication unit of the robotic system. The communication unit is preferably provided for wirelessly transmitting electronic data, for example via a radio connection, an optical interface, or the like. The communication unit is preferably provided for connecting the robotic unit to robot-external units of the robotic system. In one exemplary embodiment of the robotic system, at least the detection unit is situated as part of the robotic unit, and in particular is provided for being moved together with the robotic unit. For example, the robotic unit is designed as a lawn mower robot, as a vacuum cleaning robot, as a monitoring robot, in particular as a monitoring drone, as a lawn scarifying robot, as a floor sweeping robot, as a snow removal robot, as a cleaning robot, as a working drone, as a pool cleaning robot, or as some other robot that appears meaningful to those skilled in the art. The robotic system, in particular the robotic unit, is particularly preferably provided for carrying out the method for an application in interior spaces. The robotic unit is preferably provided for processing the work area, the robotic unit moving within the work area. In particular, the detection unit is provided for detecting the surroundings during a movement of the robotic unit through the work area. The robotic system, in particular at least the detection unit and the control and/or regulation unit, is/are preferably provided and/or configured for carrying out the method for autonomous navigation of the movable robotic unit during a movement of the robotic unit.

Due to the embodiment according to the present invention of the robotic system, an advantageously accurate determination of the position and/or the movement of the robotic unit in space and/or an advantageously accurate detection of the surroundings may be made possible. Based on information additionally ascertained from an arrangement within the surroundings, which in particular may be detected via virtual points, further reference points for navigating the robotic unit may be determined via virtual planes. An error in determining a trajectory of the robotic unit in space may advantageously be reduced, in particular compared to a determination based solely on detected virtual points. An advantageously improved interpretation of detected virtual points within the surroundings may be made possible. An advantageously exact autonomous navigation of the robotic unit may be made possible.

The method according to the present invention and/or the robotic unit according to the present invention are/is not intended to be limited to the above-described application and specific embodiment. In particular, for fulfilling a mode of operation described herein, the method according to the present invention and/or the robotic unit according to the present invention may include a number of individual elements, components, and units as well as method steps that is different from a number stated herein. In addition, for the value ranges given in the present disclosure, values within the stated limits are also considered to be disclosed and usable as desired.

BRIEF DESCRIPTION OF THE DRAWINGS

Further advantages of the present invention result from the following description of the figures. One exemplary embodiment of the present invention is illustrated in the figures. The figures and the description contain numerous features in combination. Those skilled in the art will also advantageously consider the features individually and combine them into further meaningful combinations.

DETAILED DESCRIPTION OF EXAMPLE EMBODIMENTS

Figure 1:
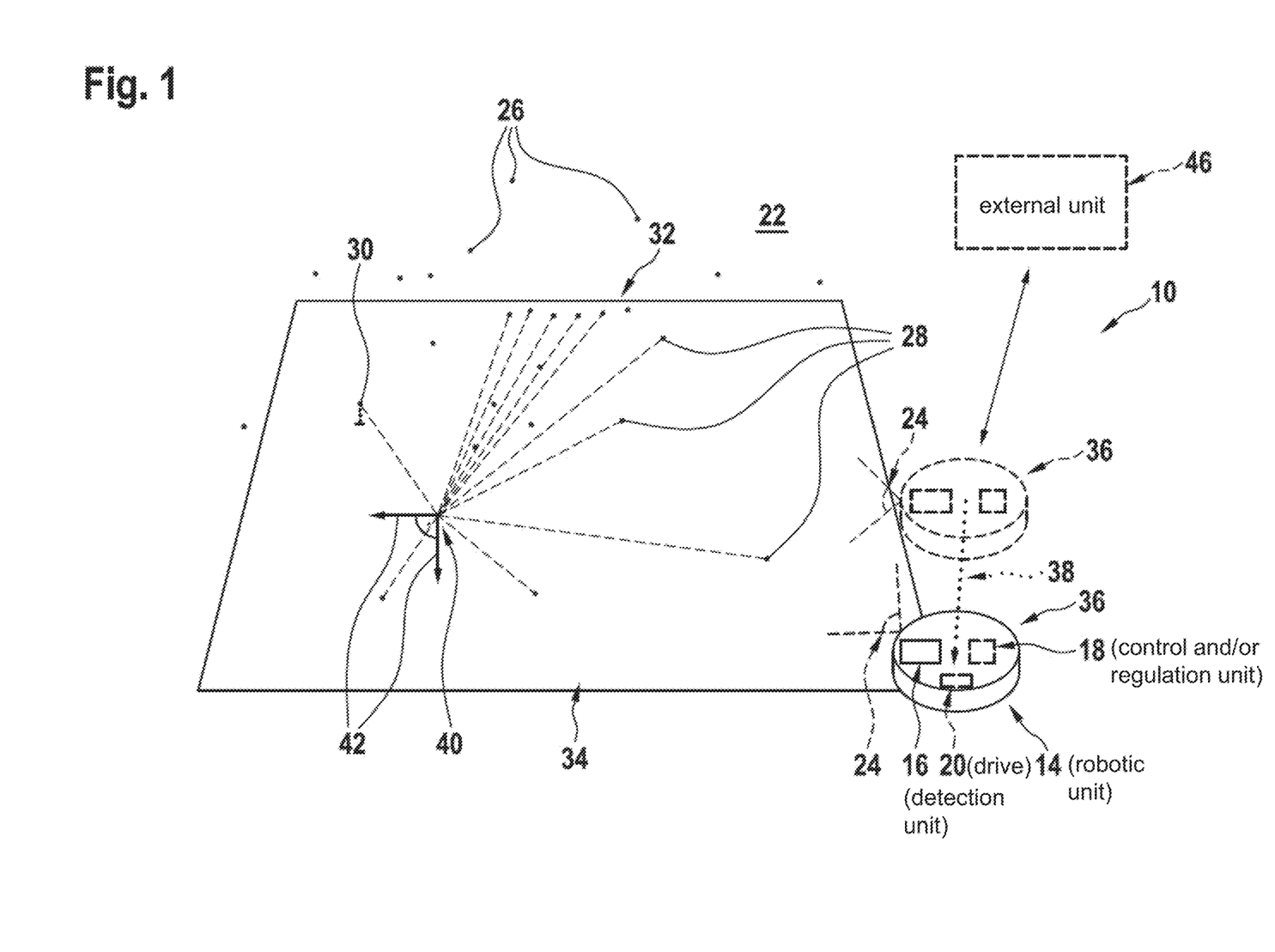
FIG. 1 shows a schematic illustration of a robotic system according to an example embodiment of the present invention for carrying out a method according to the present invention for autonomous navigation of a movable robotic unit of the robotic system as part of a SLAM method, as a function of an ascertained virtual plane.

FIG. 1 schematically shows a robotic system 10 for carrying out a method 12 for autonomous navigation of a movable robotic unit 14, in particular at least as part of a SLAM method. Robotic system 10 includes movable robotic unit 14, a detection unit 16, and a control and/or regulation unit 18. Detection unit 16 is situated at robotic unit 14, and is designed to be movable, in particular together with robotic unit 14. Control and/or regulation unit 18 has a design, at least in part, as part of robotic unit 14 and at least in part external to the robot. Control and/or regulation unit 18 includes at least one processor and a physical memory (not shown in the figures). It is possible for control and/or regulation unit 18 to be designed completely as part of robotic unit 14 or as part of a smart home system, a cloud, or the like. Robotic unit 14 is designed as a navigable semi-autonomous vacuum cleaning robot. However, other embodiments of robotic unit 14 that are floatable and/or flyable are also possible, for example as a lawn mower robot, as a monitoring robot, in particular as a monitoring drone, as a lawn scarifying robot, as a floor sweeping robot, as a snow removal robot, as a cleaning robot, as a working drone, as a pool cleaning robot, or as some other robot that appears meaningful to those skilled in the art. Robotic unit 14 includes drive unit 20 that is in particular designed, at least in part, as an electric motor, for example, and at least one means of locomotion (not shown in the figures) that is drivable via drive unit 20 for moving robotic unit 14, and that is designed, for example, as a wheel, a continuous track, a rotor, or the like. Robotic unit 14 preferably includes a steering unit for changing a movement direction of robotic unit 14, it being possible in particular for the steering unit to be designed as part of drive unit 20. Detection unit 16 is designed as a monocular detection unit, in particular as a monocular camera, at least in part. Detection unit 16 is situated, at least in part, at an outer wall of robotic unit 14. Detection unit 16 is provided for detecting surroundings 22 around robotic unit 14 and detection unit 16. Detection unit 16 is provided for detecting a plurality of virtual points 26, 28, 30 (cf. also FIGS. 4 and 5) from surroundings 22 around detection unit 16, in particular via at least two detected images 24 that differ from one another temporally and/or spatially. Virtual points 26, 28, 30 are preferably detected via a method step of a monocular SLAM method that is preferably carried out with the aid of control and/or regulation unit 18 and detection unit 16. Detection unit 16 is provided for continuously or periodically detecting surroundings 22 via virtual points 26, 28, 30, in particular during a movement of robotic unit 14 and of detection unit 16 through a space or surroundings 22.

Control and/or regulation unit 18 is configured to determine from the plurality of detected virtual points 26, 28, 30 at least one group 32 of virtual points 26, 28, 30 which preferably are all situated at least essentially within a virtual plane 34. Control and/or regulation unit 18 is preferably configured to determine the at least one group 32 of virtual points 26, 28, 30 for ascertaining virtual plane 34 via a RANSAC algorithm as a function of the plurality of detected virtual points 26, 28, 30. Control and/or regulation unit 18 is preferably configured to ascertain a representation of virtual plane 34 in space via singular value decomposition, in particular via an SVD method, as a function of group 32 of virtual points 26, 28, 30. Control and/or regulation unit 18 is preferably configured to ascertain a position 36 and/or a movement 38 of robotic unit 14 and/or of detection unit 16 and/or for a representation of surroundings 22 with the aid of a solution of an optimization problem of graph theory, preferably using detected virtual points 26 and ascertained virtual plane 34. Two different positions 36 of robotic unit 14 during a movement 38 of robotic unit 14 within surroundings 22 are shown by way of example in FIG. 1. As an example, movement 38 of robotic unit 14 is illustrated in FIG. 1 as a movement between these two positions 36. A plurality of images 24 at a plurality of different positions 36 is preferably detected during a movement 38 of robotic unit 14 within surroundings 22 or a work area of robotic system 10. Control and/or regulation unit 18 is configured to represent virtual plane 34 in a minimal representation via an origin point 40 and two mutually orthogonal unit vectors 42 (shown in FIG. 1 as an example). Control and/or regulation unit 18 is preferably configured to use virtual plane 34 via virtual points 28, projected onto virtual plane 34, of group 32 of virtual points 26, 28, 30 that form virtual plane 34, which in particular map projected points 44 (cf. FIG. 4) on virtual plane 34, for solving the optimization problem.

It is possible for robotic system 10 to be connected to an external unit 46, for example via an in particular wireless communication unit (not shown in the figures), the external unit being provided, for example, for transmitting limiting values for ascertaining virtual planes 34, position 36, and/or movement 38 of robotic unit 14 and/or of detection unit 16 and/or for representing surroundings 22, to control and/or regulation unit 18, and/or for monitoring and/or querying an operating state of robotic system 10, in particular of robotic unit 14. Other embodiments of robotic system 10, in particular of detection unit 16, of robotic unit 14, and/or of control and/or regulation unit 18, are also possible. For example, it is possible for detection unit 16 to be situated separately from robotic unit 14 and in particular to be movable independently of robotic unit 14, or for a position of detection unit 16 relative to robotic unit 14 to be known. It is also possible, for example, for control and/or regulation unit 18 to be designed/situated at least essentially completely separate/spaced apart from robotic unit 14, and preferably configured to transmit control commands for a movement of robotic unit 14 to robotic unit 14, in particular drive unit 20, a control electronics system of robotic unit 14, and/or the steering unit.

Figure 2:
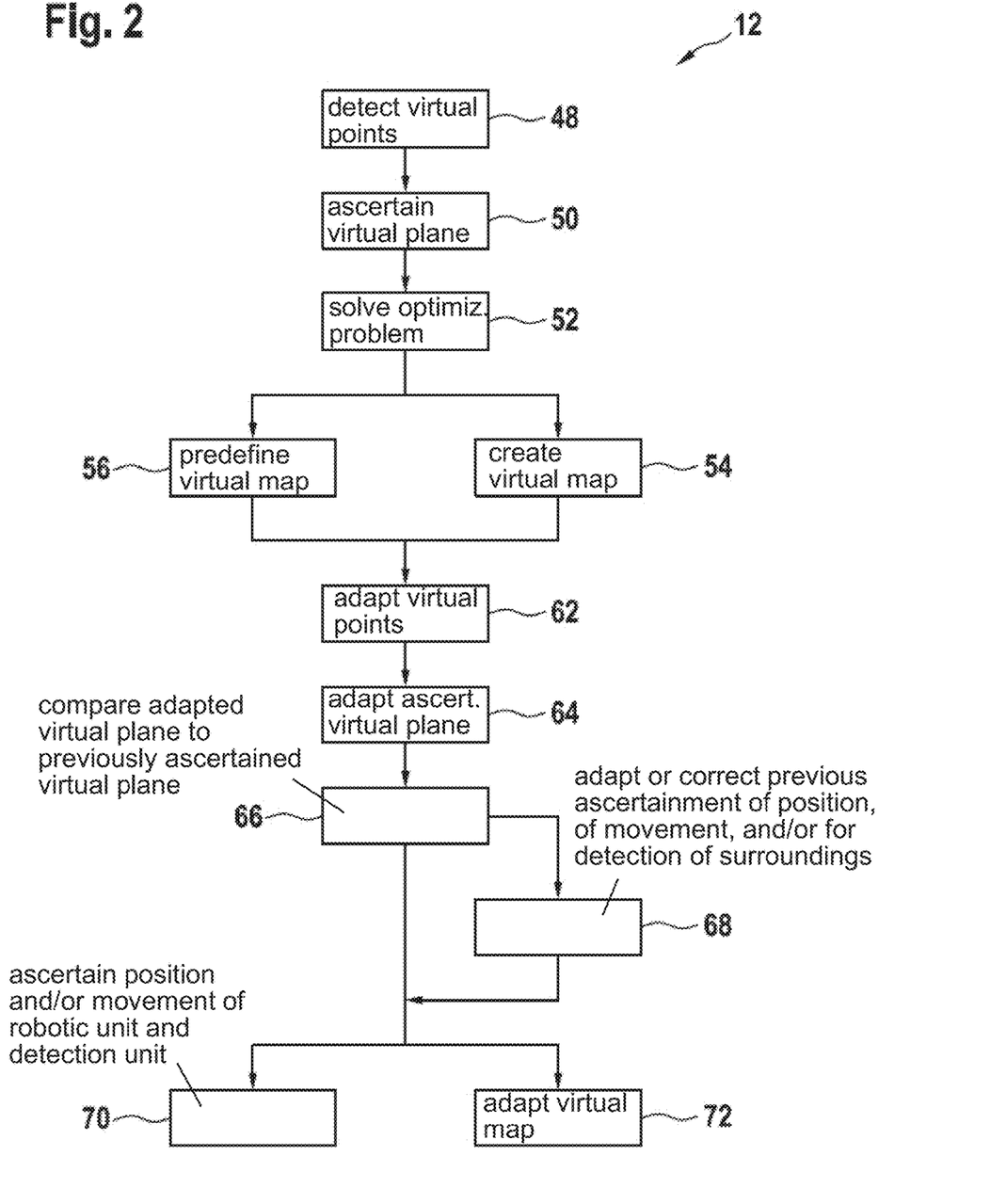
FIG. 2 shows a schematic illustration of an example of a sequence of the method according to the present invention.

FIG. 2 shows an example of a sequence of method 12 for autonomous navigation of movable robotic unit 14, in particular at least as part of a SLAM method that is carried out in particular via robotic system 10. In particular, method 12 is carried out via the control and/or regulation unit as an algorithm or as a series of algorithms running in succession, preferably automatically. A plurality of virtual points 26, 28, 30 from surroundings 22 around detection unit 16 and robotic unit 14 is detected in a method step 48 of method 12 with the aid of detection unit 16. Virtual points 26, 28, 30 from surroundings 22 around detection unit 16 are continuously or periodically detected in at least one method step of method 12, in particular method step 48, with the aid of detection unit 16. The plurality of virtual points 26, 28, 30 is detected, in particular via a monocular SLAM method, with the aid of detection unit 16 via at least two detected images 24 that are detected in a temporally, in particular spatially, offset manner relative to one another. Each virtual point 26, 28, 30 of the plurality of virtual points 26, 28, 30 is preferably individually detected in each case, in particular via a monocular SLAM method, with the aid of detection unit 16 via at least two detected images 24 that are detected in a temporally, in particular spatially, offset manner relative to one another.

Virtual plane 34 is ascertained with the aid of control and/or regulation unit 18, in each case as a function of a group 32 of virtual points 26, 28, 30 of the plurality of virtual points 26, 28, 30, in a further method step 50 of method 12. In particular, a plurality of virtual planes 34 is ascertained. With the aid of control and/or regulation unit 18, as a function of a totality of detected virtual points 26, 28, 30 a dominant virtual plane 34 is determined periodically or continuously, in particular from the plurality of ascertained virtual planes 34, and used for solving the optimization problem of graph theory. In particular, only dominant virtual plane 34 is shown in FIG. 1. It is also possible for a plurality of ascertained virtual planes 34 to be used as boundary conditions for a solution of the optimization problem of graph theory with boundary conditions. In at least one method step of method 12, in particular method step 50, groups 32 of virtual points 26, 28, 30 that form a virtual plane 34 are in each case ascertained with the aid of control and/or regulation unit 18 as a function of at least one stored limiting value parameter, which in particular describes a maximum deviation of individual virtual points 28 in each case of a group 32 of virtual points 26, 28, 30 from a virtual plane 34 to be ascertained via particular group 32.

An optimization problem of graph theory is solved in a further method step 52 of method 12, with the aid of control and/or regulation unit 18, for ascertaining a position 36 and/or a movement 38 of robotic unit 14 and/or for detecting surroundings 22 as a function of detected virtual points 26, 28, 30. In at least one method step of method 12, in particular method step 52, for ascertaining position 36 and/or movement 38 of robotic unit 14 and/or for representing surroundings 22 the at least one ascertained virtual plane 34, in particular dominant virtual plane 34, is used for solving the optimization problem of graph theory with the aid of control and/or regulation unit 18. When virtual plane 34 is used for solving the optimization problem of graph theory, virtual points 28 of group 32 of virtual points 26, 28, 30 that predefine virtual plane 34 are in each case projected onto ascertained virtual plane 34, projected points 44 situated on virtual plane 34 being individually used as boundary conditions for a solution of the optimization problem of graph theory.

In a further method step 54 of method 12, a virtual map 60 of surroundings 22 is created as a function of ascertained virtual plane 34 with the aid of control and/or regulation unit 18 (cf. also FIG. 5), in particular a boundary within virtual map 60 being represented by virtual plane 34. It is also possible for a plurality of ascertained virtual planes 34 to be used for creating virtual map 60. When virtual map 60 is created and/or virtual map 60 is stored, in particular in robotic unit 14, each virtual plane 34 used for creating virtual map 60, in particular dominant virtual plane 34, replaces at least group 32 of virtual points 26, 28, 30 that forms particular virtual plane 34. Virtual points 28 that form groups 32 of virtual points 26, 28, 30 are in each case preferably not stored in virtual map 60. Alternatively or additionally, in a further method step 56 of method 12 it is possible for a virtual map of surroundings 22 and/or of a work area of robotic system 10 to be predefined by external unit 46 and/or by a user. The predefined virtual map is preferably compared to created virtual map 60 and/or supplemented with the aid of control and/or regulation unit 18. Created virtual map 60, the predefined virtual map, and/or a supplemented virtual map are/is preferably stored in control and/or regulation unit 18 in at least one method step of method 12, in particular method step 54 or method step 56. Created virtual map 60, the predefined virtual map, and/or a supplemented virtual map are/is preferably stored at least in robotic unit 14 for navigating the robotic unit in surroundings 22 or in the work area.

In a further method step 62 of method 12, in particular after an ascertainment of dominant virtual plane 34, group 32 of virtual points 26, 28, 30 is adapted with the aid of control and/or regulation unit 18 in such a way that at least one virtual point 30, in particular a plurality of virtual points 30, of group 32 of virtual points 26, 28, 30, is removed from group 32 of virtual points 26, 28, 30 as a function of an arrangement and/or of an error parameter of virtual point 30, in particular the plurality of virtual points 30, relative to virtual plane 34 and/or relative to other virtual points 28 of group 32 of virtual points 26, 28, 30 that form virtual plane 34 (cf. FIG. 1). It is also possible, in at least one method step of method 12, in particular method step 62, in particular after an ascertainment of virtual plane 34, for group 32 of virtual points 26, 28, 30, in particular that form virtual plane 34, to be adapted with the aid of control and/or regulation unit 18 in such a way that at least one virtual point, in particular a plurality of virtual points, is added to group 32 of virtual points 26, 28, 30 as a function of an arrangement and/or of an error parameter of the virtual point, in particular the plurality of virtual points. In a further method step 64 of method 12, ascertained virtual plane 34, in particular associated with group 32, is adapted with the aid of control and/or regulation unit 18 as a function of adapted group 32 of virtual points 26, 28, 30. Adapted virtual plane 34 is compared to previously ascertained virtual plane 34 in a further method step 66 of method 12. In a further method step 68 of method 12, in particular if adapted virtual plane 34 differs significantly from previously ascertained virtual plane 34, at least one previous ascertainment of position 36 and/or of movement 38 of robotic unit 14 and/or of the detection of surroundings 22 is adapted or corrected, taking adapted virtual plane 34 into account. In particular if adapted virtual plane 34 differs from previously ascertained virtual plane 34 only negligibly, in particular within a margin of error, not at all, and/or not significantly, no adaptation or correction of values ascertained in the past takes place.

Via the solution of the optimization problem and via at least one method step of the SLAM method, a position and/or a movement of robotic unit 14 and of detection unit 16 in space or in surroundings 22 are/is ascertained in a further method step 70 of method 12 with the aid of control and/or regulation unit 18. Virtual map 60 is periodically or continuously adapted with the aid of control and/or regulation unit 18 in a further method step 72 of method 12. In particular, other embodiments of method 12 for the autonomous navigation of robotic unit 14 with the aid of robotic system 10 are also possible, for example using a different order of above-mentioned method steps 48, 50, 52, 54, 56, 62, 64, 66, 68, 70, 72, and/or using fewer or additional method steps.

Figure 3:
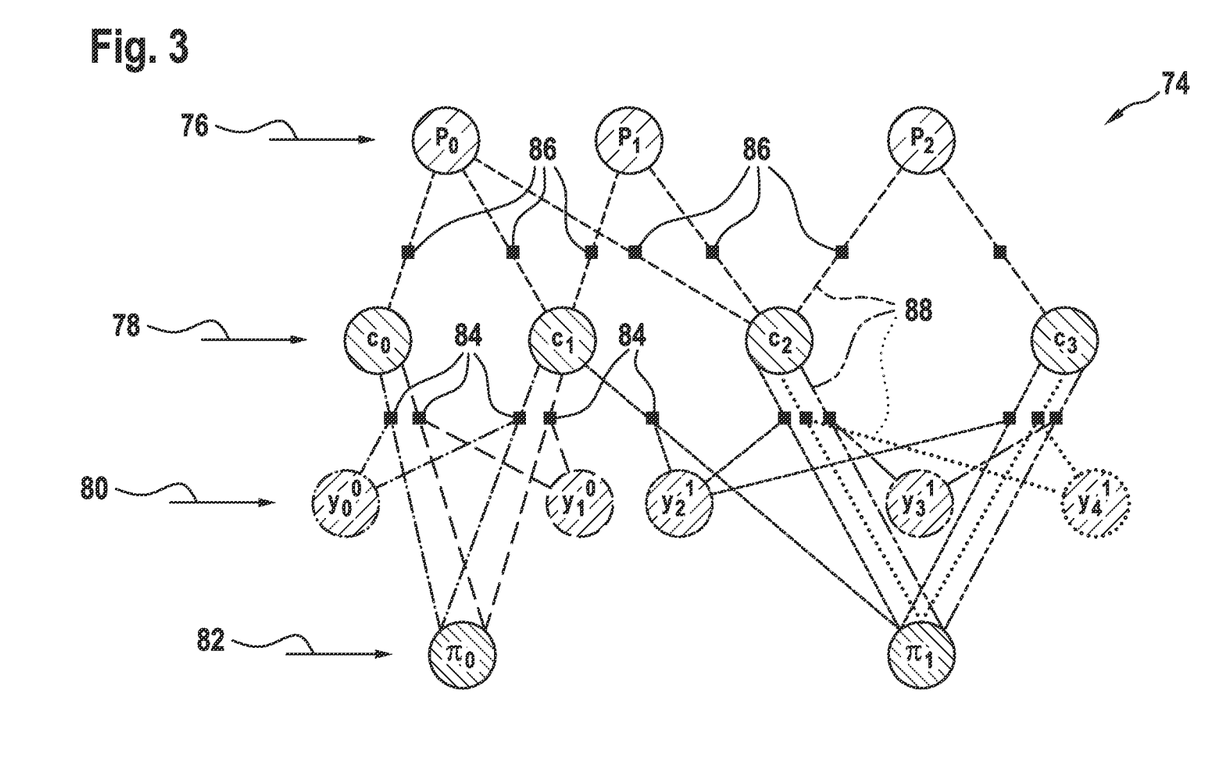
FIG. 3 shows an example of a factor graph of an optimization problem for ascertaining a position and/or a movement of the robotic unit and/or for representing the surroundings with the aid of the method according to the present invention.

FIG. 3 shows an example of a factor graph 74 of the optimization problem of graph theory. Detected virtual points 26 are illustrated in first, in particular top, column 76, in particular virtual points 28 that are combined into a group 32 for ascertaining a virtual plane 34 already having been projected onto virtual planes 34 and not being used as virtual points 26 for solving the optimization problem. In particular four different positions 36 of detection unit 16 at different times or locations and/or with different orientations of detection unit 16 are shown in a second column 78. In particular, each detected virtual point 26 is ascertained via at least two different detected images 24 that have each been detected at one of positions 36 of detection unit 16. Projected points 44, each of which has been generated from a group 32 of virtual points 26, 28, 30 on particular virtual plane 34 via a projection of a virtual point 28 that describes a virtual plane 34, are shown in a third column 80. A fourth, in particular bottom, column 82 shows two ascertained virtual planes 34. Virtual points 28 which in each case have been used for ascertaining virtual planes 34 in particular are not shown in FIG. 3. A plurality of boundary conditions 84 for solving the optimization problem is provided via projected points 44 on virtual planes 34. Further boundary conditions 86 for solving the optimization problem are provided via shown virtual points 26 within detected images 24. In particular, all points within an individual column 76, 78, 80, 82 are indirectly dependent on one another via a shared set of parameters. Vertices 88 connecting the individual points of columns 76, 78, 80, 82 each describe a relationship of the points, connected by individual vertices 88, during a detection. Based on factor graph 74 of the optimization problem shown in FIG. 3, it is apparent that a much larger number of available boundary conditions 84, 86 for solving the optimization problem may be provided via an ascertainment of virtual planes 34 and taking same into account for solving the optimization problem via projected points 44, in particular in comparison to a consideration without projected points 44. An advantageously more accurate solution of the optimization problem and thus an advantageously accurate ascertainment of a position 36 and/or a movement 38 of robotic unit 14 and of detection unit 16 in space may thus be achieved with the aid of a SLAM method, in particular an ORB-SLAM2 method. In addition, an advantageously accurate detection and representation of surroundings 22 may be made possible.

Figure 4:
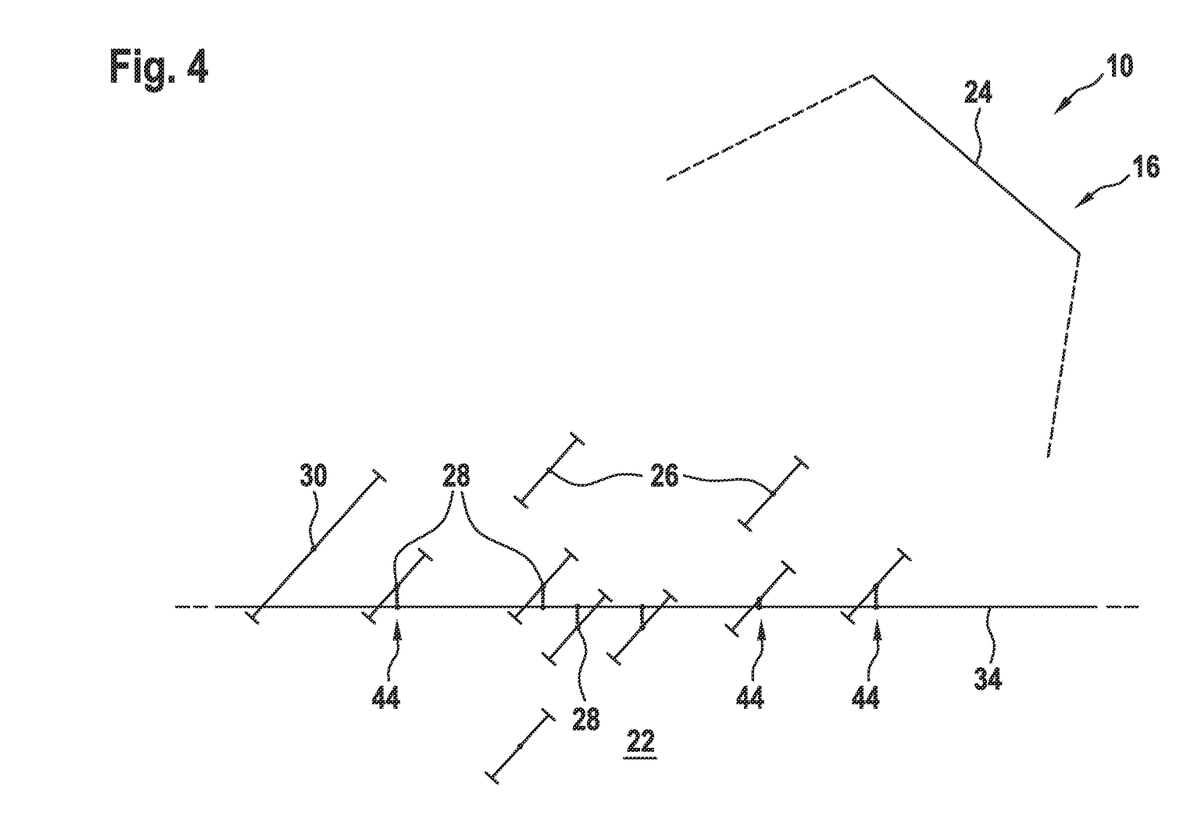
FIG. 4 shows a schematic side view along an ascertained virtual plane, together with points projected onto the virtual plane, for solving the optimization problem.

FIG. 4 shows a schematic side view of an example of an area of surroundings 22 along an ascertained virtual plane 34. Virtual points 26, 28, 30 shown in FIG. 4 are detected via detection unit 16. Virtual points 26, 28, 30 each include an error parameter, which is schematically illustrated as an uncertainty of a distance of particular virtual point 26, 28, 30 from detection unit 16. The error parameters, at least for the most part, each originate from the SLAM method for detecting virtual points 26, 28, 30 via multiple images 24. A group 32 of virtual points 26, 28, 30 that form virtual plane 34 is ascertained from virtual points 26, 28, 30 via a RANSAC method. Group 32 of virtual points 26, 28, 30 forming virtual plane 34 is ascertained with the aid of control and/or regulation unit 18 as a function of at least one stored limiting value parameter. The values of the error parameter for virtual points 28 of group 32 of virtual points 26, 28, 30 are preferably within or below the limiting value parameter. Virtual points 28 of group 32 of virtual points 26, 28, 30 are projected onto virtual plane 34 with the aid of control and/or regulation unit 18, in particular for taking into account virtual plane 34 for solving the optimization problem, in each case exactly one projected point 44 being ascertained for each of virtual points 28 of group 32 of virtual points 26, 28, 30. Detected virtual points 26, with the exception of virtual points 28 of group 32 of virtual points 26, 28, 30 and ascertained projected points 44, are preferably used with the aid of control and/or regulation unit 18 for solving the optimization problem, preferably for optimizing a cost function. In at least one method step, in particular as described in above-mentioned method step 62 of method 12, at least one virtual point 30 (shown by way of example in FIG. 4) is preferably removed from group 32 of virtual points 26, 28, 30 for ascertaining virtual plane 34 with the aid of control and/or regulation unit 18, preferably as the result of a large value of the error parameter of virtual point 30 relative to other virtual points 28 of group 32 of virtual points 26, 28, 30. Alternatively or additionally, it is possible for a/the error parameter of virtual points 26, 28, 30 to be formed as a minimal distance of individual virtual points 26, 28, 30 from ascertained virtual plane 34.

Figure 5:
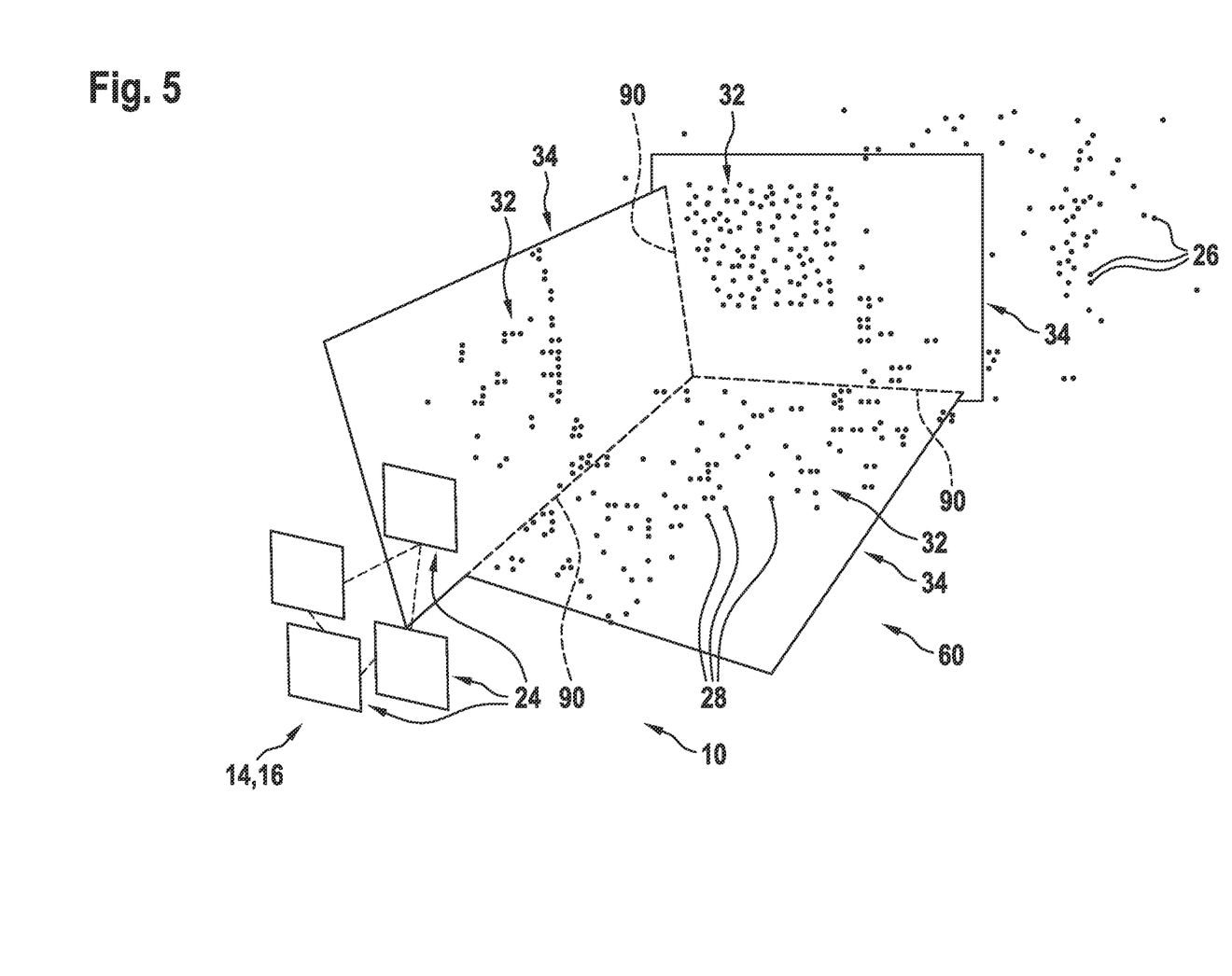
FIG. 5 shows a schematic illustration of the robotic system according to the present invention for carrying out the method according to the present invention as a function of a plurality of ascertained virtual planes.

FIG. 5 shows robotic system 10 in different surroundings 22 as an example. Via a plurality of virtual points 26, 28 that are detected with the aid of detection unit 16, a plurality of groups 32 of virtual points 26, 28, 30 is ascertained, each of which forms a virtual plane 34. Three virtual planes 34 are ascertained or selected from ascertained virtual planes 34 with the aid of control and/or regulation unit 18, virtual points 28 of each of groups 32 of virtual points 26, 28, 30 that form the three virtual planes 34 in each case including an average error parameter that is less than a predefined limiting value of the average error parameter. However, it is also possible to select only two virtual planes 34 or also more than three virtual planes 34 for solving the optimization problem. Virtual planes 34 are preferably intended for use of virtual plane 34 for solving the optimization problem as a function of an average error parameter of group 32 of virtual points 26, 28, 30 that forms particular virtual plane 34. A virtual map 60 of surroundings 22 is preferably created with the aid of control and/or regulation unit 18 as a function of ascertained virtual planes 34. It is possible for ascertained virtual planes 34 for creating virtual map 60 to be delimited and/or linked at least via line of intersection 90 of virtual planes 34. Alternatively or additionally, it is possible for a class to be associated with virtual planes 34 and/or groups 32 of virtual points 26, 28, 30 as a function of an arrangement relative to detection unit 16 and/or robotic unit 14, the class, for example, making possible a semantic association of virtual points 28 and/or virtual planes 34. In particular, detected virtual points 26, 28 are detected via a plurality of images 24 that are detected via detection unit 16, multiple positions 36 of detection unit 16 being shown by way of example in particular in FIG. 5.

What is claimed is:

1. A method for autonomous navigation of a movable robotic unit, the method comprising the following steps:
    detecting, using a detection unit, a plurality of virtual points from surroundings around the detection unit;
    ascertaining, using a control unit, at least one virtual plane as a function of at least one group of virtual points of the plurality of virtual points;
    solving, using the control unit, as a function of the detected virtual points, an optimization problem of graph theory for at least one of: (i) ascertaining a position and/or a movement of the robotic unit, or (ii) detecting the surroundings;
    wherein the ascertained virtual plane is used for the solving of the optimization problem of graph theory using the control unit for at least one of: (i) the ascertaining of the position and/or the movement of the robotic unit, or (ii) representing the surroundings.

2. The method as recited in claim 1, wherein when the virtual plane is used for solving the optimization problem of graph theory, the virtual points of the group of virtual points that used for ascertaining the virtual plane are each projected onto the ascertained virtual plane, projected points situated on the at least one virtual plane being used as boundary conditions for solving the optimization problem of graph theory.

3. The method as recited in claim 1, further comprising:
    continuously or periodically detecting virtual points from the surroundings, using the detection unit; and
    continuously or periodically determining, using the control unit, a dominant virtual plane as a function of a totality of detected virtual points and the dominant virtual plane is used for solving the optimization problem of graph theory.

4. The method as recited in claim 1, further comprising:
    ascertaining, using the control unit, the group of virtual points forming the virtual plane as a function of at least one stored limiting value parameter that describes a maximum deviation of individual virtual points of the group of virtual points from the virtual plane to be ascertained.

5. The method as recited in claim 1, further comprising:
    ascertaining a plurality of virtual planes using the control and/or regulation unit, a plurality of ascertained virtual planes being used as boundary conditions for solving the optimization problem of graph theory with boundary conditions.

6. The method as recited in claim 1, wherein the detection unit is a monocular detection unit, the plurality of virtual points being detected via at least two images that are detected temporally offset relative to one another using the detection unit.

7. The method as recited in claim 1, further comprising:
    creating, using the control unit, a virtual map of the surroundings as a function of the at least one virtual plane, a boundary within the virtual map being represented by the virtual plane.

8. The method as recited in claim 7, wherein when the virtual map is created and/or the virtual map is stored, in the robotic unit, by including the at least one virtual plane and not including the group of virtual points.

9. The method as recited in claim 1, further comprising:
    after the ascertainment of the at least one virtual plane, adapting, using the control unit, the group of virtual points in such a way that a plurality of virtual points of the group of virtual points is removed from the group of virtual points as a function of an arrangement and/or of an error parameter of the plurality of virtual points, relative to the virtual plane and/or relative to other virtual points of the group of virtual points that form the virtual plane.

10. The method as recited in claim 9, further comprising:
    adapting the ascertained virtual plane as a function of the adapted group of virtual points using the control and/or regulation unit, previous ascertainments of the position and/or the movement of the robotic unit and/or for detecting the surroundings being adapted, taking the adapted virtual plane into account.

11. An at least semi-autonomous robotic system, comprising:
    at least one movable robotic unit;
    at least one detection unit; and
    at least one control unit;
    wherein the system is configured to:
        detect, using the at least one detection unit, a plurality of virtual points from surroundings around the detection unit,
        ascertain, using the at least one control unit, at least one virtual plane as a function of at least one group of virtual points of the plurality of virtual points,
        solve, using the at least one control unit, as a function of the detected virtual points, an optimization problem of graph theory for at least one of: (i) ascertaining a position and/or a movement of the robotic unit, or (ii) detecting the surroundings,
        wherein the ascertained virtual plane is used for the solving of the optimization problem of graph theory using the control unit for at least one of: (i) the ascertaining of the position and/or the movement of the robotic unit, or; (ii) representing the surroundings.

* * * * *